Sept. 3, 1968  E. B. KOLT  3,400,182
METHOD OF INTERCONNECTING SPACED PANELS
AND MEANS FOR USE THEREIN
Filed Aug. 3, 1965
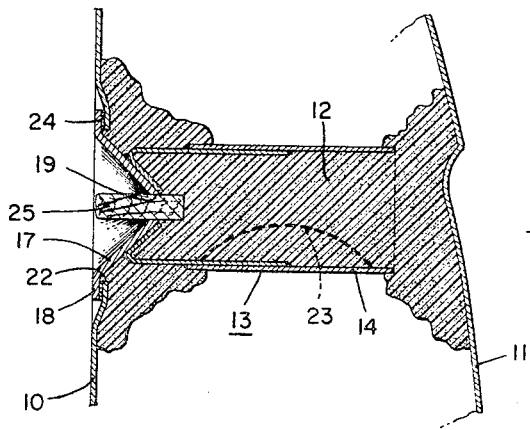
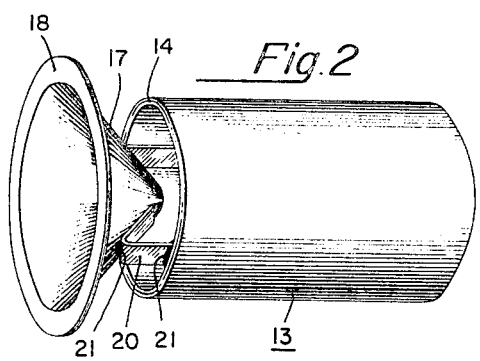
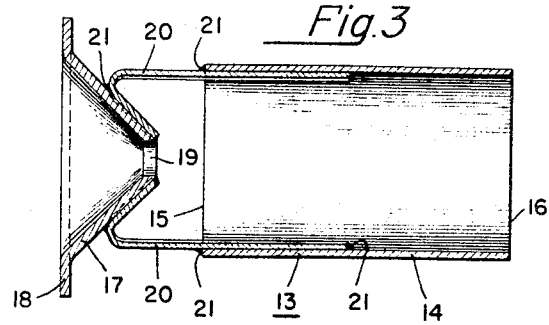
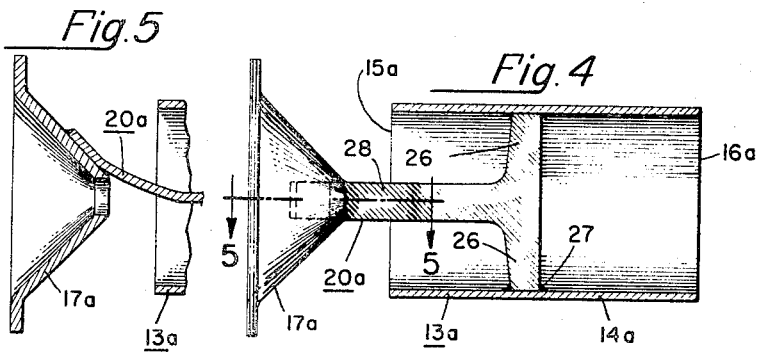
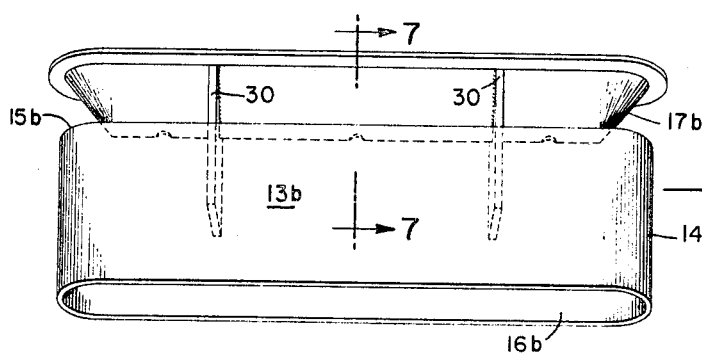
INVENTOR.
ERWIN B. KOLT
BY John B. Sowell
ATTORNEY

3,400,182
METHOD OF INTERCONNECTING SPACED PANELS AND MEANS FOR USE THEREIN

Erwin B. Kolt, Birmingham, Mich., assignor to The Budd Company, Philadelphia, Pa., a corporation of Pennsylvania
Filed Aug. 3, 1965, Ser. No. 476,905
9 Claims. (Cl. 264—45)

ABSTRACT OF THE DISCLOSURE

A method and apparatus for supporting intermediate portions of panels having their edges joined and their mid-sections in spaced relationship to each other. The method consisting of placing a container supporting foamable adhesive material between the panels through an opening in one of the panels and using a portion of the container to close the opening and prevent escape of the foaming adhesive. Then as the adhesive foams and bridges a portion of the space between the panels and adheres to each panel, the set foamed adhesive provides support for the mid-sections of the panels.

---

This invention relates to a method of interconnecting spaced panels and to a means for use in the practice of such method.

A vehicle door, for example, usually embodies spaced inner and outer panels of relatively large surface area secured together around their peripheries. In operation of the vehicle, these panels frequently are subject to vibration, unless reinforced, and produce an objectionable noise.

The primary object of the present invention is to provide a novel method of non-metallically interconnecting the panels of a spaced panel assembly.

Another object is to strengthen a panel assembly and to eliminate vibration and noise in a single and economical structure.

A further object is to provide a method of interconnecting the panels of a spaced panel assembly in which the resultant interconnection is non-metallic in nature.

A still further object of the present invention is to provide a novel means for use in a method of non-metallically interconnecting the panels of a spaced panel assembly.

These being among the objects of the present invention, the same consists in certain method steps and features of construction to be hereinafter described with reference to the accompanying drawing, and then claimed, having the above and other objects in view.

In the drawing which illustrates one suitable means for practicing the invention, FIG. 1 is a cross-sectional view showing a non-metallic connection between two spaced panels which connection was produced in accordance with the method of the present invention;

FIG. 2 is a perspective view of the means or holder used in the practice of the method of the present invention;

FIG. 3 is a longitudinal cross-section of the holder shown in FIG. 2;

FIG. 4 is a view, partially in cross-section, of a modified type of holder;

FIG. 5 is a cross-section taken on the line 5—5 of FIG. 4;

FIG. 6 is a perspective view of a further type of holder, which is peripherally elongated instead of the cylindrical type of holder shown in FIGS. 1 to 5, incl.;

FIG. 7 is a transverse section taken on the line 7—7 of FIG. 6.

The method of the present invention is practiced through the use of an expandable or foamable adhesive. There are several well-known foamable resins having adhesive properties which when mixed with an appropriate foam promoting catalyst will foam in expanding manner to a volume many times that of the initial viscous mix, and which upon completion of the chemical reaction will produce a solid foamed resinous mass. In the purpose of the following description and the claims, this material is designated as a foamable adhesive or a foamable resin.

Broadly and briefly stated, the method of the present invention consists in supporting an initially viscous mixture of a foamable adhesive and a foam promoting catalyst between upright spaced panels of a panel assembly and during the chemical reaction therebetween confining the resultant foaming material to a flow toward and into intimate, adhering contact with the panels, whereby upon completion of the chemical reaction between the foamable adhesive and catalyst a solid foamed resinous mass interconnecting the panels is produced.

Referring to the accompanying drawing in which like numerals refer to like parts throughout the several views. I have shown in FIG. 1 the inner panel 10 and an outer panel 11 of a vehicle door which panels are interconnected by a mass 12 of expanded or foamed adhesive resin. The mass 12 of foamed adhesive resin adheres to the panels and strengthens the panel assembly and prevents vibration and noise of the individual panels. It is to be understood, however, that the present invention is applicable not only to door panel assemblies but also to any assemblage of spaced panels which is desired to be strengthened or with respect to which it is desired to eliminate vibration or oil canning of the individual panels.

In the practice of the method of the present invention, I utilize a holder for a mixture of foamable adhesive and foam promoting catalyst in its initial viscous state. The holder 13 shown in FIGS. 1, 2 and 3, comprises a hollow, cylindrical shell 14 having open ends 15 and 16, and a conical member 17 having a flange 18 at its larger end and a central opening 19. The cylindrical shell 14 and conical member 17 are assembled together by means of strap-like members 20 with the open end of the shell 14 longitudinally spaced from the smaller end of the conical member 17. It is to be understood that the conical opening 19 may be omitted when the foaming adhesive is inserted into the cylinder prior to installation of the holder and before the adhesive is expanded.

The shell 14, conical member 17 and straps 20 may be of any suitable material, such as metal, plastic or cardboard, and the connections between the same may be of any suitable type, such as an appropriate adhesive, or in the case of metal, as shown in FIG. 3, by weldments 21.

In the practice of the method of the present invention an opening 22 is cut in one of the panels, panel 10, as shown in FIG. 1. With the holder 13 in a horizontal position, a sufficient predetermined amount of the viscous, foamable adhesive and appropriate catalyst is deposited within the shell 14 as shown in broken outline 23 in FIG. 1, and the holder 13 is inserted within the panel opening 22 and the flange 18 of the conical member 17, which overlaps the panel 10, is secured to the panel 10 such as by adhesive 24, or by any other suitable means such as, for example, screws or a bayonet lock, not shown. The opening 19 is then or prior thereto closed by a plug 25 of wood or any other suitable material to prevent flow of the foaming adhesive therethrough. As the foamable or expandable material expands through foaming, it is directed or confined by the shell 14 to flow through the opposite open ends of the shell into adhesive contact with the inner surfaces of the panels 10 and 11 and with the conical member 17, as shown in FIG. 1. The mass 12 of foamed adhesive upon completion of the chemical reaction caused by the catalyst thus interconnects the inner surfaces of the panels 10 and 11. It not only strengthens the panel assembly but also serves to eliminate vibration and oil canning of the individual panels. While other shapes may be employed, conical member 17 and cylindrical member 14 serve to reduce the amount of adhesive resin required in the space between the panels.

The foamable adhesive and catalyst may be deposited within the shell 14 in any suitable manner such as by a mixing gun. Another procedure is to use a dispensing device of the type shown in Van Sciver Patent No. 3,159,312. On the other hand, the holder 13 may first be inserted and the foamable adhesive and catalyst then deposited within the shell 14 by suitable means through the opening 19 in conical member 17, after which the plug 25 is forced into the opening 19.

The holder 13 as shown in FIGS. 4 and 5 is similar to the holder previously described except for the means for interconnecting the cylindrical shell 14a and conical member 17a. Here, the connection is in the form of a T-shaped member 20a with the arms 26 of the T cemented or bonded as at 27, in any suitable manner to the inner surface of shell 14a and the leg 28 of the T attached to the smaller end of the conical member 17a and connected or bonded to the outside cone surface as at 19.

It may be desirable to provide an elongated connection between spaced panels. In FIGS. 6 and 7 I have shown a suitable holder 13b for this purpose. As here shown, the hollow shell 14b, with open ends 15b and 16b, is peripherally elongated and is interconnected with the flanged supporting member 17b by spaced elements 30 cemented or bonded to shell 14b as at 31. In this case, a slot, instead of a circular opening, is to be provided in one panel of the panel assembly.

The manner of use of the holders 13a and 13b is the same as with holder 13 and may not require a plug 25 in opening 19 as employed in holder 13.

Since the cylindrical shell of FIGS. 3 and 4 does not contact either one of the panels of the panel assembly, it is not affected by the shape of the panels. This makes it possible to standardize the shells in groups according to the diameter of the panel holes and approximate distance from the panels.

From the foregoing description it thus can be seen that I have provided a simple and economical method of providing a non-metallic connection between the panels of a spaced panel assembly, and novel means for use in the practice of the method of the present invention. The term "upright panel assembly," as used in the claims, is to be understood as meaning an assembly having two spaced apart generally vertical panels.

Formal changes may be made without departing from the spirit and substance of the broad invention, the scope of which is commensurate with the appended claims.

What I claim is:

1. The method of interconnecting the panels of an upright panel assembly which consists in positioning between said panels in supported position a generally horizontal, peripherally continuous, open ended shell with the open ends thereof spaced from the inner surfaces of said panels, and immediately prior to the positioning of said shell, depositing on the interior thereof an initially viscous mixture of a foamable adhesive resin and a catalyst which promotes foaming of the resin, whereby subsequent to positioning of the shell, and during the chemical action between the resin and catalyst said shell directs the foaming resin into contact with said panels, and whereby to produce, upon completion of the chemical action, a foamed resinous mass extended between and adhered to said panels.

2. The method generally in accordance with claim 1, but in which the initially viscous mixture is deposited on the interior of the shell after the shell is positioned between said panels.

3. The method of interconnecting the panels of an upright panel assembly in which the panels are spaced apart, which consists in providing an opening in one of said panels, inserting through said opening into the space between said panels an open ended peripherally continuous horizontal shell, the shell being supported by a member adapted to close said opening, and immediately prior to insertion of said shell through said opening depositing on the interior of said shell an initially viscous mixture of a foamable resin having adhesive characteristics and a catalyst which promotes foaming of the resin, whereby upon chemical reaction between the resin and catalyst the resultant foaming material is directed by the shell to flow into intimate adhesive contact with said panels, and whereby upon completion of the chemical reaction to provide a foamed resinous mass extending between and adhered to said panels.

4. A holder for use in a method of interconnecting the panels of an upright panel structure in which the panels are spaced apart in generally vertical relationship and in which one of the panels has an opening therein for access to the space between said panels, said holder comprising a peripherally continuous, open-ended shell, a closure member spaced from one end of said shell and relatively rigid means interconnecting said closure member and said shell for supporting said shell from said closure member, said shell being adapted to be inserted through said panel opening into the space between said panels and said closure member in the inserted position of said shell being adapted to close said panel opening and to be secured to the opening-containing panel.

5. A holder in accordance with claim 4, in which the shell is cylindrical in shape.

6. A holder in accordance with claim 4, in which the shell is peripherally elongated.

7. A holder in accordance with claim 4, in which the closure member is conical in shape and has a peripheral flange.

8. The method of interconnecting the spaced apart portions of panels of an upright panel assembly having the outer edges thereof connected, the central portion thereof spaced apart, one of said panels having an aperture in the area of the desired interconnection, and a tubular holder for insertion between said panels having a holder support for supporting said holder and engaging the entire edge of said aperture for effectively closing the aperture, comprising the steps of:
 (1) placing a mixture of a foamable resin having adhesive characteristics and a catalyst which promotes foaming of the resin within the holder,
 (2) inserting the holder containing the foamable resin and catalyst between the panels through the aperture so that the ends of the holder are adjacent to and spaced from the panels and the holder support contacts the edge of the aperture,
 (3) securing the holder support to the edge of the aperture for effectively closing the aperture with the holder support,
 (4) permitting the foamable resin to complete the foaming action by the chemical reaction of the resin and catalyst whereby the resultant foaming material is directed from each end of the holder into contact with each panel and the holder support, and
 (5) permitting the foamed material to cure and provide a resinous mass extending between and adhered to said panels.

9. The method of interconnecting the spaced apart portions of panels of an upright panel assembly having the outer edges thereof connected, the central portion thereof spaced apart, one of said panels having an aperture in the area of the desired interconnection, and a tubular holder for insertion between said panels having a holder support for supporting said holder and engaging the entire edge of said aperture for effectively closing the aperture, said holder support having an opening therein, comprising the steps of:
 (1) inserting the holder between the panels through the aperture so that the ends of the holder are adjacent to and spaced from the panels for permitting the flow of foaming material between the end of the holder and the adjacent panel and with the holder support contacting the edge of the aperture, (2) securing the holder support to the edge of the aperture for efficiently closing the aperture with the holder support, (3) depositing through the opening in the holder support, a mixture of a foamable resin having adhesive characteristics and a catalyst which promotes foaming of the resin within the holder, (4) closing the opening in the holder support by a plug means, (5) permitting the foamable resin to complete the foaming action by the chemical reaction of the resin and catalyst whereby the resultant foaming material is directed from each end of the tubular holder into contact with each panel and the holder support, and (6) permitting the foamed material to cure and provide a resinous mass extending between and adhered to said panels.

References Cited

UNITED STATES PATENTS

| | | | |
|---|---|---|---|
| 2,744,042 | 5/1956 | Pace | 52—309 XR |
| 3,251,912 | 5/1966 | Fish | 264—45 |

JULIUS FROME, *Primary Examiner.*

L. GARRETT, *Assistant Examiner.*